(No Model.)
G. W. MAHAN.
CAR FENDER.
No. 541,771. Patented June 25, 1895.
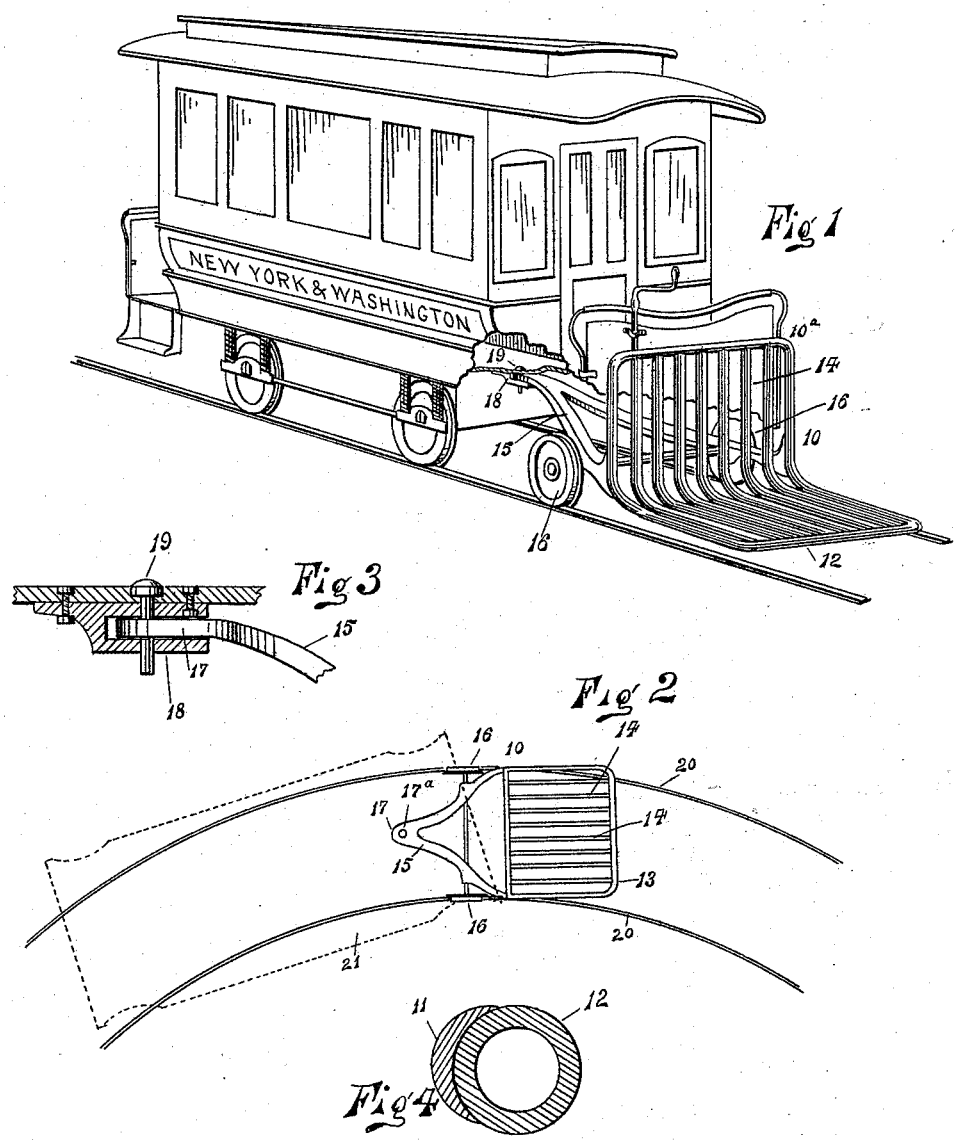
WITNESSES:
Bertram H. Saunders
M. A. Filkins
INVENTOR
George W. Mahan
BY
W. P. Hutchinson
ATTORNEY.

UNITED STATES PATENT OFFICE.

GEORGE W. MAHAN, OF COLD SPRING HARBOR, NEW YORK.

CAR-FENDER.

SPECIFICATION forming part of Letters Patent No. 541,771, dated June 25, 1895.

Application filed March 15, 1895. Serial No. 541,842. (No model.)

*To all whom it may concern:*

Be it known that I, GEORGE W. MAHAN, of Cold Spring Harbor, in the county of Suffolk and State of New York, have invented certain new and useful Improvements in Car-Fenders, of which the following is a full, clear, and exact description.

My invention relates to improvements in car fenders such as are attached to the ends of cars, and particularly street cars, to prevent people from being run over.

The object of my invention is to produce a simple, strong and efficient fender which is so cheap that its cost will not bar it from coming into general use, which is constructed and attached to the car in such a way that it easily follows the curve of a track and is at all times directly over the track rails, and which has a cushioned surface made in such a way that a person tripped and caught by the fender cannot possibly be seriously injured.

To these ends my invention consists of certain features of construction and combinations of parts which will be hereinafter described and claimed.

Reference is to be had to the accompanying drawings, forming a part of this specification, in which similar figures of reference indicate corresponding parts in all the views.

Figure 1 is a perspective view of a car provided with my improved fender, a portion of the car being broken away to illustrate the manner in which the fender is attached to the car. Fig. 2 is a diagrammatic plan illustrating the manner in which the fender and car round a curve. Fig. 3 is an enlarged detail sectional view of the coupling connecting the fender with the car; and Fig. 4 is an enlarged detail cross section of one of the rails or bars of the fender, and shows the manner in which the elastic cushions are supported on the bars.

The fender 10 is arranged at the ends of a car, and the fender frame is curved from top to bottom, as shown clearly in Fig. 1, so that it will extend from a point near the top of the dash board to a point in advance of the car and in close proximity to the track. The upper end $10^a$ of the fender is thus held high enough so that if a person is struck and tripped by the fender, he will be thrown against the upper part thereof and caught on the cushions to be hereinafter described, and thus he will be saved from injury.

The fender frame is made up of a suitable edge rail 11, which is concaved on its outer surface and in the concavity is held a hollow rubber cushion 12, which entirely covers the edge of the frame so that no metal can possibly strike a person tripped by the fender. The frame work of the fender is also provided with parallel longitudinal bars 14, which are exactly like the edge rail or bar 11, and are covered similarly with cushions. It will thus be seen that the entire exposed surface of the fender is a series of rubber cushions of sufficient resiliency to catch a person without in any way injuring him, even though the car be running at a high rate of speed.

The fender frame has a rearward extension 15, which is supported on wheels 16 adapted to run on the track rails and the rear extremity of the part 15 terminates in a tongue 17 which is adapted to enter the socket 18, which is similar to an ordinary car coupling draw head only smaller, and which is fastened to the bottom of the car, as shown clearly in Figs. 1 and 3.

The rear end, or tongue, 17 of the fender frame is provided with a pin hole $17^a$ (see Fig. 2) to receive a suitable coupling pin 19 which is dropped through a hole in the car floor and through the socket 18, as shown clearly in Fig. 3, and thus the fender is securely fastened to the car and may be detached at any time by simply removing the pin 19. This arrangement of the fender enables it to easily follow the curve of a track, and as it is entirely independent of the car, except for its pivotal connection at its extreme rear end, it will be seen that the wheels 16 serve as the fulcrum, and when the car in rounding a curve pushes the rear end of the fender frame to one side, the front end swings toward the opposite side of the track, and so the front portion of the fender is held at all times above the track and in a position to catch any person who happens to be in the path of the car.

Having thus described my invention, I claim as new and desire to secure by Letters Patent—

The combination with the car, of the car fender, comprising a skeleton frame-work projecting forward from the car and turned up in front of the dash-board, the said framework comprising a series of parallel bars and having its edge and top surfaces cushioned, a rearward extension projecting from the skeleton frame-work and coupled to the car bottom, and a single pair of supporting wheels located near the center of the fender and adapted to run on the track rails, substantially as described.

GEORGE W. MAHAN.

Witnesses:
W. B. HUTCHINSON,
M. A. FILKINS.